United States Patent Office 2,758,136
Patented Aug. 7, 1956

2,758,136

DECOLORIZING OXO ALDEHYDES WITH ACIDS

Karl Buchner, Duisburg-Hamborn, Germany, assignor to Ruhrchemie Aktiengesellschaft, Oberhausen-Holten, Germany, a German corporation No Drawing. Application July 18, 1950, Serial No. 174,570

Claims priority, application Germany August 5, 1949

6 Claims. (Cl. 260—604)

This invention relates to new and useful improvements in decolorizing oxo aldehydes with acids.

In the catalytic addition of water gas onto unsaturated carbon compounds and especially unsaturated hydrocarbons, dark colored aldehydes, aldehyde mixtures, or aldehyde type products are obtained. Their dark color is caused by organic metal compounds which are primarily derived from the catalysts used in the water gas addition but which in part are also derived from the material of which the reaction vessels are constituted.

Aqueous solutions of acids or salts have been hitherto used for the purpose of purifying and decolorizing such aldehydes. When proceeding in this manner, however, the raw aldehydes have to be treated for hours with these aqueous salt or acid solutions before the dark color has been satisfactorily lightened. A subsequent intensive washing with pure water is then necessary in order to remove remnant acid and salt residues. In the washing operation, however, the aldehyde will dissolve some water or gives rise to the formation of an aqueous aldehyde emulsion. It is, however, also possible that the aldehydes will dissolve water or emulsify the same. In any event, the washing with water of the aldehydes, which has been required in the hitherto used purification methods, causes considerable losses of valuable aldehydes.

In spite of this cumbersome and wasteful treatment, it is not possible, in many cases, to obtain a lasting purification since the initially yellow aldehydes will usually very quickly darken when exposed to light which materially restricts their usefulness.

It has been found that substantially water light and substantially permanently clear aldehydes may be directly obtained and which are substantially free from water and which furthermore are not contaminated with water soluble acids or salts by treating the raw dark colored aldehydes below their boiling point and at any desired pressure with substantially solid or organic solvent dissolved, organic or inorganic acids, or acid salts. High boiling aldehydes are preferably purified in this manner at atmospheric pressure, whereas low boiling aldehydes are preferably treated at elevated pressure.

Suitable solvents useful for the purifying acids or salts may be any desired non-aqueous compounds preferably the lower alcohols, esters, or other oxygen-containing hydrocarbon compounds which are liquid at normal temperature. Generally already a small addition of the lower alcohols and particularly methanol suffices, the same acting substantially as a solvent intermediary accelerating the reaction between the metal organic compounds and the acids or salts. An alcohol addition of about 0.1–1 volume per cent is normally satisfactory for this purpose.

The aldehyde purification in accordance with the invention may be particularly advantageously and simply effected by the use of oxalic acid which is applied in finely pulverized condition and preferably with the simultaneous addition of a small amount of methanol. Also, succinic acid and citric acid give satisfactory purification results in accordance with the invention. Among inorganic acids, phosphoric acid, in the form of its water free anhydride, is particularly suitable as a purification agent. Also acid sulfates may be utilized for the aldehyde purification.

Inasmuch as the dark coloration of the raw aldehydes is caused by small amounts of metal compounds contained therein, it is possible to effect the aldehyde purification normally with about 2–5 grams of acid or acid salt per liter of raw aldehyde. The lightening of the dark coloration is almost always obtained within a few minutes. The precipitated metal compounds may then be easily removed by filtration. By coupling the filtration with a simultaneous or subsequent treatment with active carbon or similar adsorbents it is possible to obtain the aldehydes completely colorless and substantially water clear without the occurrence of any undesirable subsequent recurrence of dark color.

The filtered impurities are composed of metal compounds which may be used again in the production of the catalyst required in the water gas addition.

The following examples are furnished by way of illustration and not of limitation:

Example I

An olefinic hydrocarbon mixture was prepared by means of iron catalysts from a gas mixture which contained 50 parts by volume of hydrogen and 40 parts by volume of carbon monoxide. From this hydrocarbon mixture a fraction boiling between 103° C. and 130° C. was separated off. This fraction was treated with water gas in an autoclave for one hour at a temperature of 140° C.–150° C. and a pressure of 170 kg./sq. cm. in the presence of a cobalt-magnesium-kieselguhr catalyst which contained 8 parts of magnesium oxide and 200 parts of kieselguhr for each 100 parts of cobalt metal. A raw $C_9$ aldehyde of substantially black color was obtained having a density of $d_{20°C.}=0.772$ and a refraction-index $n_D^{20}$ of 1.4130. Because of the unreacted paraffin hydrocarbons still present the boiling range of this raw $C_9$ aldehyde was from 100° C. to 200° C. 1000 cc. of this raw $C_9$ aldehyde was admixed with 5 grams of pulverized oxalic acid and 5 cc. of methanol. This mixture was shaken for about 5 minutes. During the shaking operation, the color changed from black to dark brown, and then green to light brown. 1 g. of activated carbon was then added for each 1000 cc. of the aldehyde used, and the mix was then filtered through a plaited filter under exclusion of air oxygen. The final product obtained in this manner consisted of almost 1000 cc. of a substantially water light $C_{10}$ aldehyde dissolved in hydrocarbon (for every 1000 cc. of raw aldehyde material used) which did not again change its water light color upon exposure to light even upon prolonged standing.

Example II

The raw $C_{10}$ aldehyde specified in Example I, was admixed with 10% by weight of succinic acid and 1% by volume of methyl alcohol. This mixture was intensively shaken for about 105 minutes. The color changed from black over brown and green into light yellow. After the addition of about 0.1% by weight of activated carbon and thorough shaking, the mass was filtered whereby a substantially completely colorless aldehyde was obtained which was substantially free of all metal compounds.

Example III 1000 cc. of the raw $C_{10}$ aldehyde specified in the preceding examples was admixed with 10 g. of phosphorpentoxide ($P_2O_5$ water free). This mixture was shaken for about 20 minutes and then filtered. The filtrate consisted of about 1000 cc. of a substantially colorless $C_{10}$ aldehyde. There remained on the filter a dark red colored deliquescent mass containing cobalt and iron phosphate.

*Example IV*

1000 cc. of a raw $C_9$ aldehyde was admixed with 10 g. of crystalline citric acid and 10 cc. of methanol. The mixture was shaken for about 210 minutes. Subsequent filtration yielded a yellowish-green colored aldehyde, the coloration of which could not be any further improved by the addition of small amounts of activated carbon.

*Example V*

1000 cc. of a raw $C_{11}$ aldehyde was admixed with about 100 g. of potassium bisulfate whereupon the mixture was shaken for about 30 minutes. The color of the aldehyde passed over dark green into yellowish-green. By filtration over activated carbon, an improved color of from light yellow to light green could be obtained for the $C_{11}$ aldehyde.

As will be thus seen from the foregoing, the invention within the broad concept thereof essentially comprises a method for the production of substantially water white aldehydes from products derived from the catalytic addition of water gas to unsaturated hydrocarbon compounds which comprises contacting such aldehydes with a substantially non-aqueous member of the group consisting of substantially solid condition organic acids, inorganic acids, organic acid salts, and inorganic acid salts, and organic solvent solutions of said acids and acid salts, and maintaining such contact at a temperature below the boiling temperature of such aldehydes for a period sufficient to substantially obtain maximum decolorization of said aldehydes and thereafter recovering a substantially water light aldehyde product. As pointed out already, the pressure may be any desired pressure. The amounts of the group member to be used are preferably so adjusted that they do not appreciably exceed stoichiometric amounts calculated on the amount of the metal compounds present in the discolored aldehyde product. Preferably, however, 0.5-2% of the group member calculated on the aldehyde material to be treated are present.

Though methanol gives best results in the practice of the invention, it is possible to use other lower series members and preferably up to about 3 carbon atoms.

I claim:

1. Method for the decolorization of aldehydes derived from the catalytic addition of water gas to unsaturated hydrocarbons, which comprises contacting such an aldehyde with a non-aqueous solution of a member selected from the group consisting of oxalic acid, succinic acid, and citric acid in an aliphatic alcohol having from 1–3 carbon atoms at a temperature below the boiling temperature of the aldehyde for a period sufficient to substantially obtain maximum decolorization of the aldehyde, and thereafter recovering a substantially color-purified aldehyde product.

2. Process according to claim 1, in which said group member is present in amount not appreciably exceeding stoichiometric amounts calculated on the metal compounds contained in said aldehyde.

3. Process according to claim 1, in which said group member is present in amount of about 0.5–2% by weight of the aldehyde to be treated.

4. Process according to claim 1, in which said aliphatic alcohol is present in amount of from 0.1–1% of the aldehyde to be treated.

5. Process according to claim 1, in which said group member is oxalic acid.

6. Process according to claim 5, which includes contacting the reaction product of said contacting with activated carbon.

References Cited in the file of this patent

FOREIGN PATENTS 493,493    Belgium _____ Feb. 15, 1950

OTHER REFERENCES

"Organic Chemistry," Fuson and Snyder, page 131, John Wiley & Sons, Inc. (1942).

Fiat Final Report No. 1000, "The Oxo Process" PB–81383, December 26, 1947, pp. 34, 35.

"Chem. Abstracts," 43 3542[h] (May 10, 1949).